March 6, 1951 S. F. BUSHMAN 2,543,831
PROTECTION OF CATHODE-RAY TUBE SCREENS
Filed Feb. 10, 1948
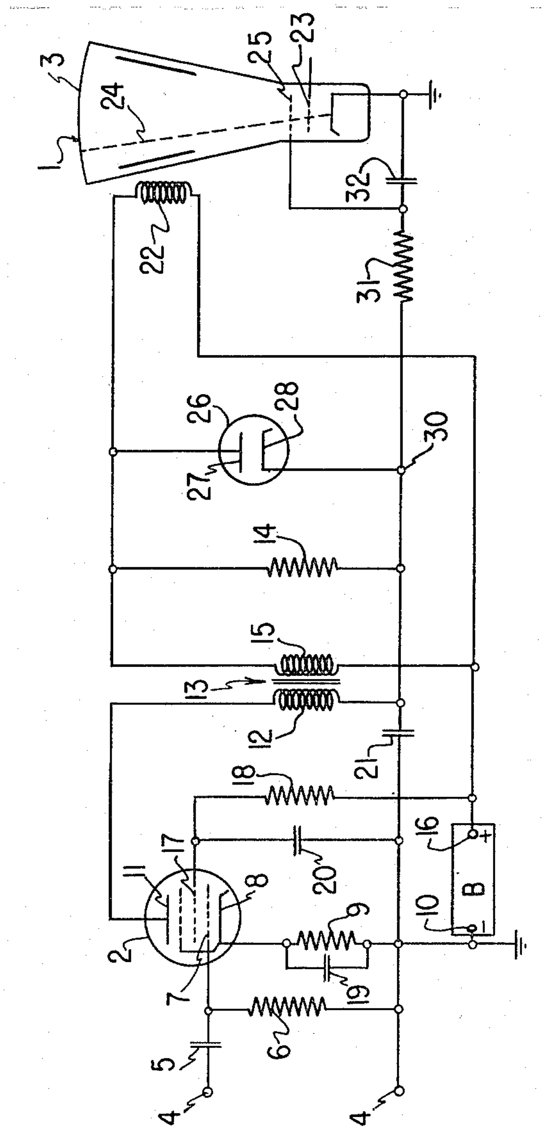
INVENTOR.
Stephen F. Bushman
BY Foorman L. Mueller
Atty Patented Mar. 6, 1951 2,543,831

UNITED STATES PATENT OFFICE 2,543,831

PROTECTION OF CATHODE-RAY TUBE SCREENS

Stephen F. Bushman, Chicago, Ill., assignor to Belmont Radio Corporation, Chicago, Ill., a corporation of Illinois Application February 10, 1948, Serial No. 7,464

5 Claims. (Cl. 315—20)

This invention relates to cathode ray tubes and particularly to the deflecting circuits associated with such tubes.

In systems employing cathode ray tubes there is always the danger that a deflecting circuit may fail and cause the scanning beam or ray of the tube to be concentrated in a relatively small point or area on the fluorescent screen, instead of being oscillated rapidly back and forth as during normal operation. Damage to the screen invariably results when a scanning beam of the usual intensity stays in one spot for an appreciable length of time.

An object of the present invention is to protect the screen of a cathode ray tube by automatically reducing the intensity of the scanning beam when failure of a deflecting circuit occurs.

The invention has particular application to the cathode ray tubes used in television receivers, and in that connection a further object is to reduce the beam intensity as an incident to failure of the horizontal deflection circuit of the receiver.

A still further object is to provide novel and improved means adapted to function as described above for protecting the cathode ray tube screen from burning out.

A feature of the invention is that the cathode ray tube is furnished with a grid potential (on its second grid, for example) the magnitude of which depends upon the presence or absence of a deflecting field in the tube.

Another feature is that the deflecting energy is utilized in part to boost the grid bias which controls the intensity of the scanning beam. If the deflector fails, the intensity-controlling bias no longer is boosted, and the scanning beam is accordingly weakened so that it cannot harm the screen.

The foregoing and other objects, features and advantages of this invention will be better understood by reference to the following description of a preferred embodiment taken in conjunction with the accompanying drawing which schematically illustrates such embodiment.

The invention is particularly adapted to be used with a cathode ray tube having magnetic deflectors. The horizontal deflecting circuit associated with the tube includes a booster-damper arrangement which is utilized in the present instance to control the bias applied to the second grid of the cathode ray tube. The energy stored in the magnetic field produced by the horizontal deflecting coil of the tube is utilized during the return trace periods to charge a capacitor unidirectionally. The voltage of the capacitor, combined with the B-plus voltage furnished by the power supply, determines the potential of the second grid. If the horizontal deflecting circuit fails, the capacitor discharges and thereby reduces the potential of the second grid, weakening the electron beam or cathode ray of the tube so that it cannot injure the viewing screen.

Referring now to the figure, the horizontal deflecting circuit of the cathode ray tube 1 includes an output tube 2 for amplifying the sawtooth voltages generated by a suitable sawtooth generator (not shown). The sawtooth voltage pulses, which are timed to produce the horizontal sweep of the scanning spot on the screen 3 of the cathode ray tube 1, are applied to the input terminals 4 of the tube 2. The sawtooth pulses pass through a coupling capacitor 5 and a grid leak resistor 6 and are applied to the control grid 7 of the output tube 2. The cathode 8 of the tube 2 is connected through a cathode biasing resistor 9 to the negative or ground terminal 10 of a voltage supply source B. The plate or anode 11 of the tube 2 is connected in series through the primary winding 12 of an output transformer 13, a resistor 14, and the secondary winding 15 of the transformer 13 to the positive terminal 16 of the voltage source B. This plate circuit arrangement makes it possible to "boost" the voltage obtained from the source B, as will be explained presently, and it also reduces the direct-current magnetization of the transformer core. The screen grid 17 of the tube 2 is connected through a dropping resistor 18 to the positive terminal 16 of the voltage source B. Suitable bypass capacitors 19 and 20 are provided for the cathode biasing resistor 9 and the screen dropping resistor 18, respectively. The resistors 9 and 18 are optional, depending upon the particular circuits employed.

The sawtooth pulses applied to the grid 7 of the tube 2 are amplified by this tube and flow through an output circuit including the plate 11, primary 12 of transformer 13 and the capacitor 21. In the illustrated apparatus the capacitor 21 couples one end of the primary 12 to the B-minus terminal 10, although it can be arranged differently to produce the same result as the one described hereinafter, if desired. The sawtooth pulses induced in the secondary 15 of the transformer 13 pass through the horizontal deflecting coil 22 of the cathode ray tube 1 to produce the horizontal sweep of the cathode ray spot on the screen 3.

The cathode ray tube 1 includes a control grid 23 which varies the intensity of the electron beam or cathode ray 24 in accordance with received video signals. As the beam 24 impinges on the screen 3, it produces a luminous spot or trace, the brightness of which is determined by the intensity of the beam 24. The video receiving circuits are not illustrated herein since they are not pertinent to the present invention.

The tube 1 also includes a second grid 25, which customarily is maintained at the positive potential of the B-voltage source in conventional television circuits. This grid 25, however, also may be utilized to control the intensity of the beam 24 in accordance with the present invention. To this end, I propose to apply a boosted voltage to the second grid 25 during normal operation of the television receiver. In order to obtain this boosted voltage I arranged a diode rectifier or damping tube 26 in parallel with the resistor 14. The plate 27 of the diode 26 is electrically connected to the junction of the secondary 15, resistor 14 and deflecting coil 22, while the cathode 28 is electrically connected to the junction of the primary 12 and the capacitor 21. The energy which is stored in the field of the deflecting coil 22 during each forward sweep of the electron beam 24 across the screen 3 of the tube 1 is discharged through the rectifier 26 during the return trace of the beam to build up a charge on the capacitor 21. The total voltage of the capacitor 21 comprises the voltage of the plate supply source B plus the additional direct voltage derived from the discharge of the horizontal deflecting coil 22.

The point 30 on the high-potential side of the capacitor 21 is connected through a resistor 31 to the second grid 25 of the cathode ray tube 21. The grid 25 is bypassed to ground through a suitable capacitor 32. Thus, the total positive bias applied to the grid 25 when the horizontal deflecting coil is operating is substantially greater than the voltage furnished by the source B. If for any reason the horizontal deflecting circuit should fail so that the deflecting coil 22 no longer is energized, the surplus charge of the capacitor 21 leaks off through the discharge paths afforded by the tube 2 and the resistor 14, so that the potential of the point 30 is reduced substantially to the level of the potential at the positive terminal 16 of the source B. In other words, the potential of the grid 25 is reduced substantially to the B-plus voltage level. This greatly reduces the intensity of the scanning beam 24 impinging on the screen 3 of the cathode ray tube 1. The circuit is so designed that B-plus potential on the grid 25 is insufficient to produce a perceptible or injurious trace of the beam 24 on the screen 3 when the beam 24 is horizontally stationary.

If, for any reason, the voltage supply source B should fail, the potential of the point 30, and therefore that of the grid 25, will drop substantially below the normal value, and again the electron beam 24 of the tube 1 wil be reduced in intensity. Thus, the screen 3 of the tube 1 is protected from damage due to any cause which prevents the scanning beam 24 from sweeping horizontally across the face of the screen 3 in the normal manner.

The above described safety feature for protection of the screen 3 safeguards the tube 1 against damage caused by loss of horizontal deflection. Failure of vertical deflection is far less likely to occur and produces only negligible damage in comparison with failure of horizontal deflection. Obviously, however, the vertical deflection circuit could be arranged in a similar fashion to protect the screen 3 if so desired. Therefore, it is evident that I have provided a protective circuit in which the intensity-controlling grid 25 of the cathode ray tube 1 is boosted to an operating level when the horizontal deflecting circuit is functioning normally, and is reduced to a harmless level when the horizontal deflecting circuit fails.

The illustrated embodiment is capable of being modified without departing from the principles described above, and it is intended that the appended claims cover all such modifications as fall within the proper scope of the invention.

I claim:

1. In a television receiver which includes a cathode ray tube having a fluorescent screen and means for directing an electron beam thereon, and a grid to which a substantially steady voltage is applied for controlling the acceleration and density of the beam, and which receiver includes deflection coils associated with said tube through which oscillating current is applied for deflecting the electron beam thereof; a system for limiting the acceleration of the beam when the beam is not deflected including in combination, a rectifier, condenser means, a source of potential, said condenser means being connected to said source of potential and also being connected in series with said rectifier to said deflection coils so that the energy in said deflection coils produces a voltage across said condenser means when current is applied to said deflection coils to deflect said beam which is added to the voltage of said source, and means for applying said voltage across said condenser means to said grid of said cathode ray tube so that a high intensity beam is provided when said beam is deflected by said coils and the intensity of said beam is reduced when said beam is not deflected to thereby prevent damage to the screen.

2. In a television receiver which includes a cathode ray tube having a fluorescent screen and means for directing an electron beam thereon, electrodes to which a signal is applied for modulating the beam, and a grid to which a substantially steady voltage is applied for controlling the acceleration and density of the beam, and which receiver includes deflection coils associated with said tube for deflecting the beam thereof; a system for providing a saw-tooth current wave in said deflection coils and for limiting the acceleration of the beam when the beam is not deflected including in combination, an oscillator connected to said coils for supplying a saw-tooth current wave thereto including a damping diode valve and a condenser, a source of potential for said oscillator, said condenser being connected to said source of potential and also being connected in series with said diode valve across said deflection coils so that the energy in said deflection coils produces a voltage across said condenser when current is supplied to said deflection coils which is added to the voltage of said source, and means for applying said voltage across said condenser to said grid of said cathode ray tube so that a high intensity beam is provided when said beam is deflected by said coils and the intensity of said beam is reduced when said beam is not deflected to thereby prevent damage to the screen.

3. In a television receiver which includes a cathode ray tube having means for providing an electron beam, electrodes to which a relatively low voltage is applied for modulating the beam, and a grid to which a larger substantially steady voltage is applied for controlling the acceleration and density of the beam, and which receiver includes coils for producing fields which deflect the beam; a circuit for controlling the acceleration of the beam including in combination rectifier means and condenser means connected in series to said deflection coils, a source of potential, said condenser means being connected to said source of potential so that said condenser means is charged to the voltage of said source added to the voltage which is provided by said rectifier from the energy in said coils, and means for applying the voltage across said condenser means to said grid of said cathode ray tube, to thereby provide sufficient voltage for said grid so that said beam is of high intensity.

4. In a television receiver which includes a cathode ray tube having means for providing an electron beam, and a grid to which a substantially steady voltage is applied for controlling the acceleration and density of the beam, and which receiver includes coils for producing fields which deflect the beam; the combination including, a generator for providing sawtooth current in said deflection coils comprising a damping diode valve and a condenser connected in series across said deflection coils, a source of potential for energizing said generator, said condenser being connected to said source of potential so that the voltage from said source is added to the voltage which is provided by said diode valve from the energy in said coils, and means for applying the voltage across said condenser to said grid of said cathode ray tube, to thereby provide sufficient voltage for said grid so that said beam is of high intensity.

5. A system for protecting the screen of the cathode ray picture tube of a television receiver which tube includes a grid for controlling the acceleration and density of the beam impinging the screen, and which receiver includes deflection coils and oscillator means having an inductance element connected to the deflection coils for supplying oscillating current thereto for deflecting the beam of the tube, said system including in combination, rectifier means, condenser means, a source of potential, a charging circuit for said condenser means including said source of potential, at least a portion of said inductance element and said rectifier means connected in series across said condenser means for charging the same, said portion of said inductance element and said rectifier means being so connected in said series circuit that a voltage is produced across said condenser means when oscillating current is applied to said deflecting coils which is added to the voltage of said source, so that said condenser means is charged to a voltage greater than the voltage of said source, and circuit means connected to said condenser means and to said grid of said cathode ray tube for applying the voltage across said condenser means to said grid, so that said grid is at a voltage greater than the voltage of said source when current is provided for deflecting the beam and is at the voltage of said source when no current is applied, to thereby reduce the acceleration of the beam and protect the screen when the beam is not deflected.

STEPHEN F. BUSHMAN.

REFERENCES CITED

The following references are of record in the file of this patent:

UNITED STATES PATENTS

| Number | Name | Date |
|---|---|---|
| 2,153,216 | Urtel | Apr. 4, 1939 |
| 2,210,702 | Bowman-Manifold | Aug. 6, 1940 |
| 2,261,776 | Poch | Nov. 4, 1941 |
| 2,440,418 | Tourshou | Apr. 27, 1948 |
| 2,440,787 | Schade | May 4, 1948 |
| 2,448,771 | Christaldi | Sept. 7, 1948 |